Nov. 11, 1969   N. KOOT   3,477,527
KELLY AND DRILL PIPE SPINNER-STABBER
Filed June 5, 1967   8 Sheets-Sheet 1
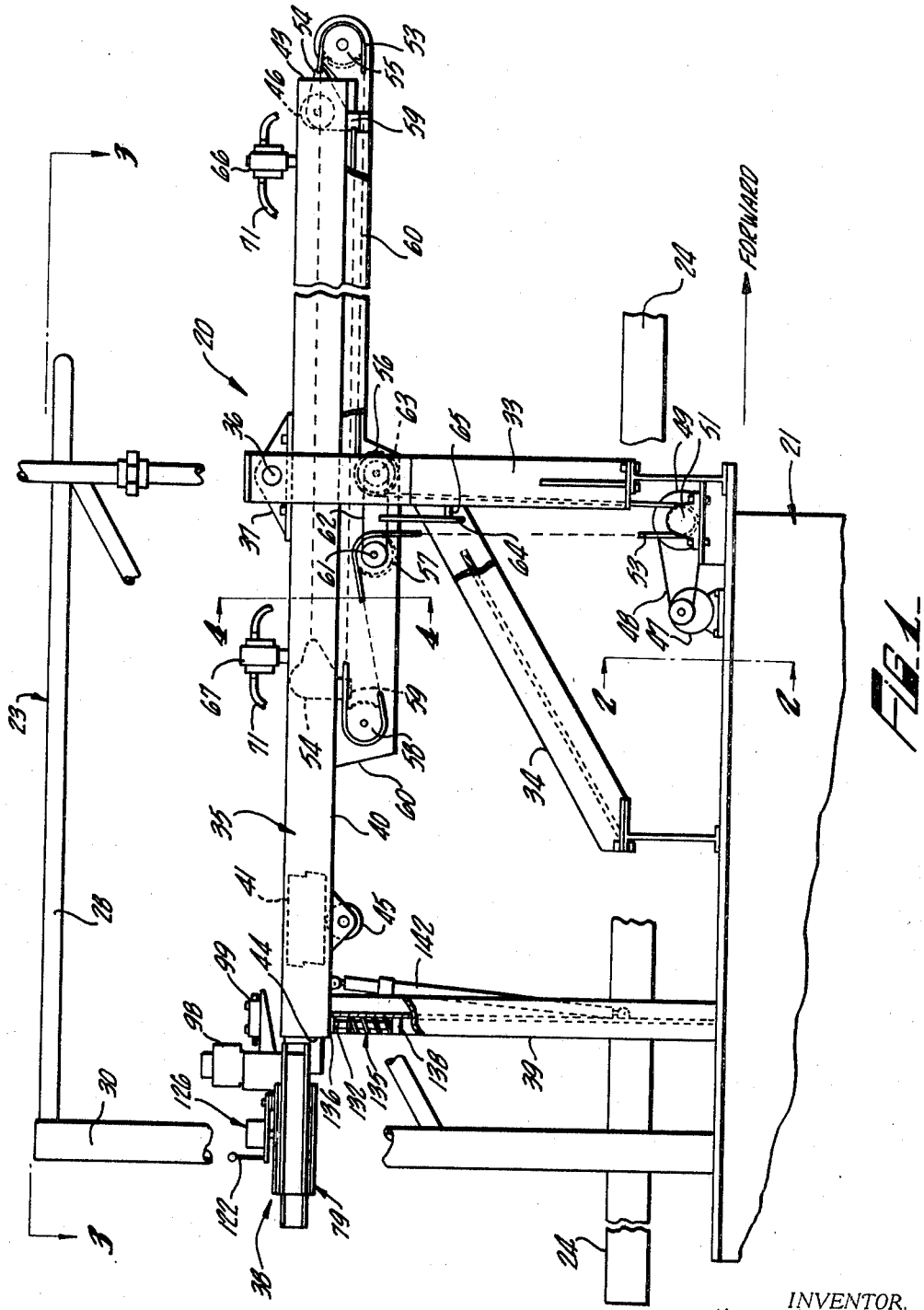
INVENTOR.
NICK KOOT
BY
Christie, Parker & Hale
ATTORNEYS

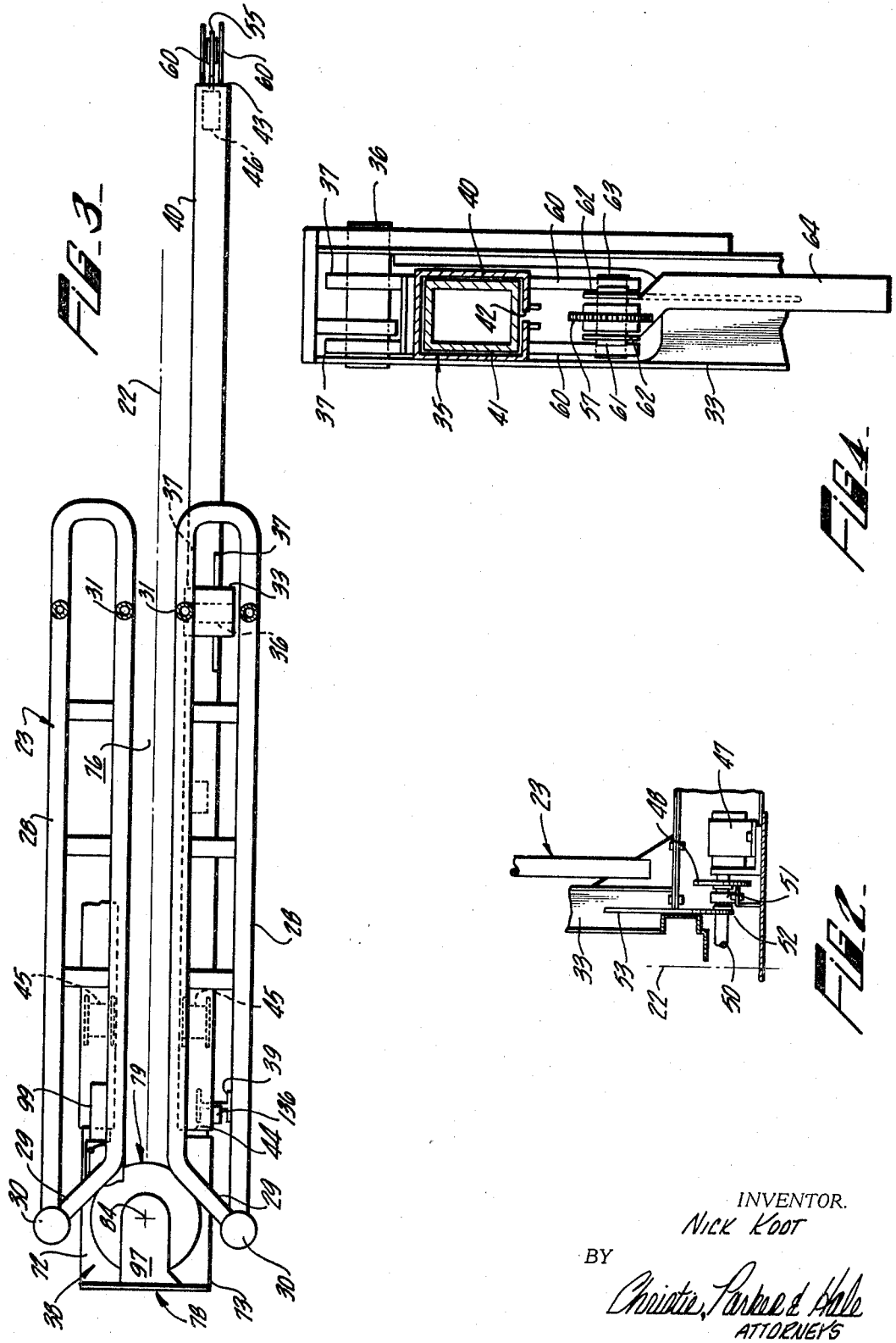

Nov. 11, 1969   N. KOOT   3,477,527
KELLY AND DRILL PIPE SPINNER-STABBER
Filed June 5, 1967   8 Sheets-Sheet 3

INVENTOR.
NICK KOOT
BY
Christie, Parker & Hale
ATTORNEYS

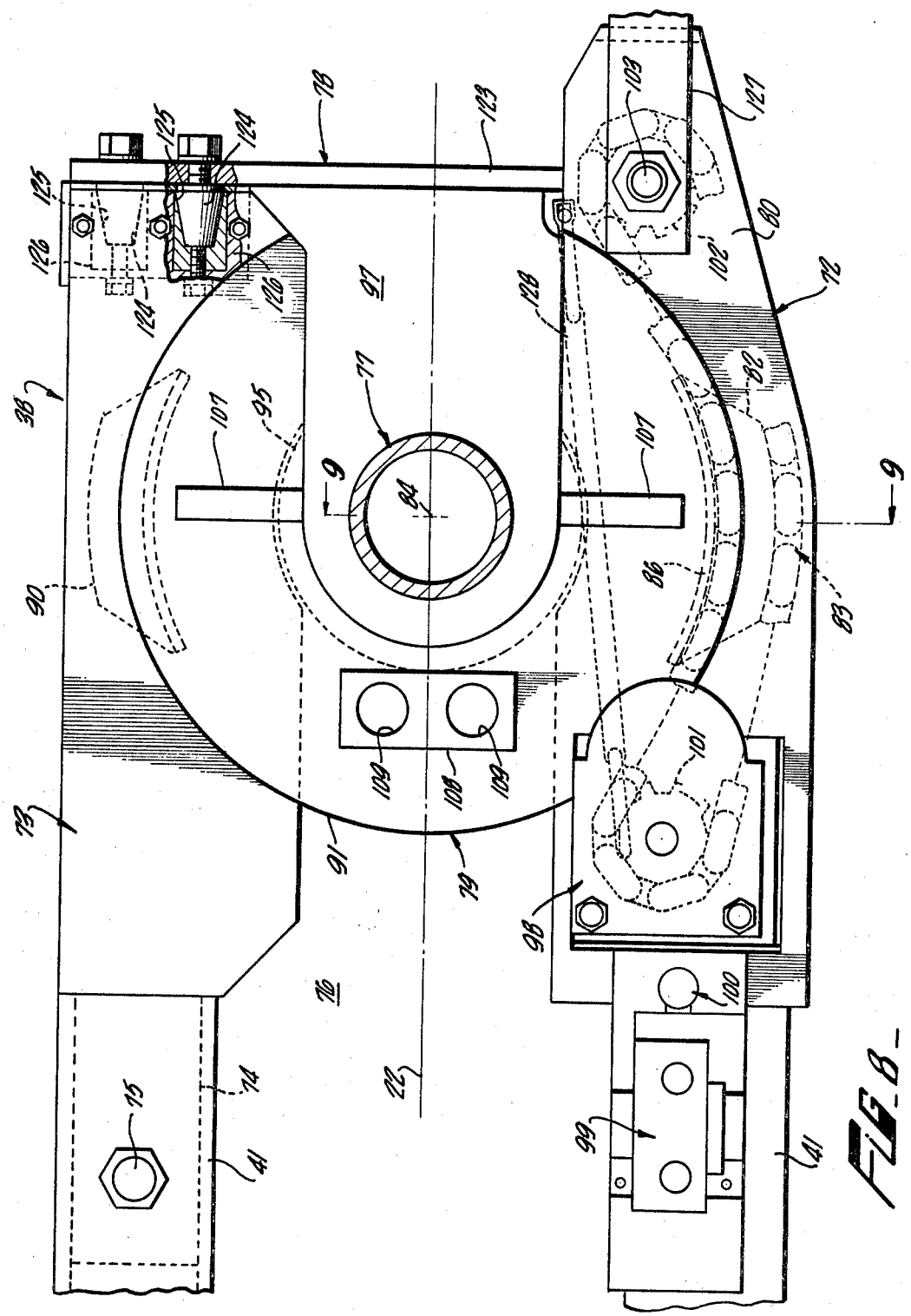

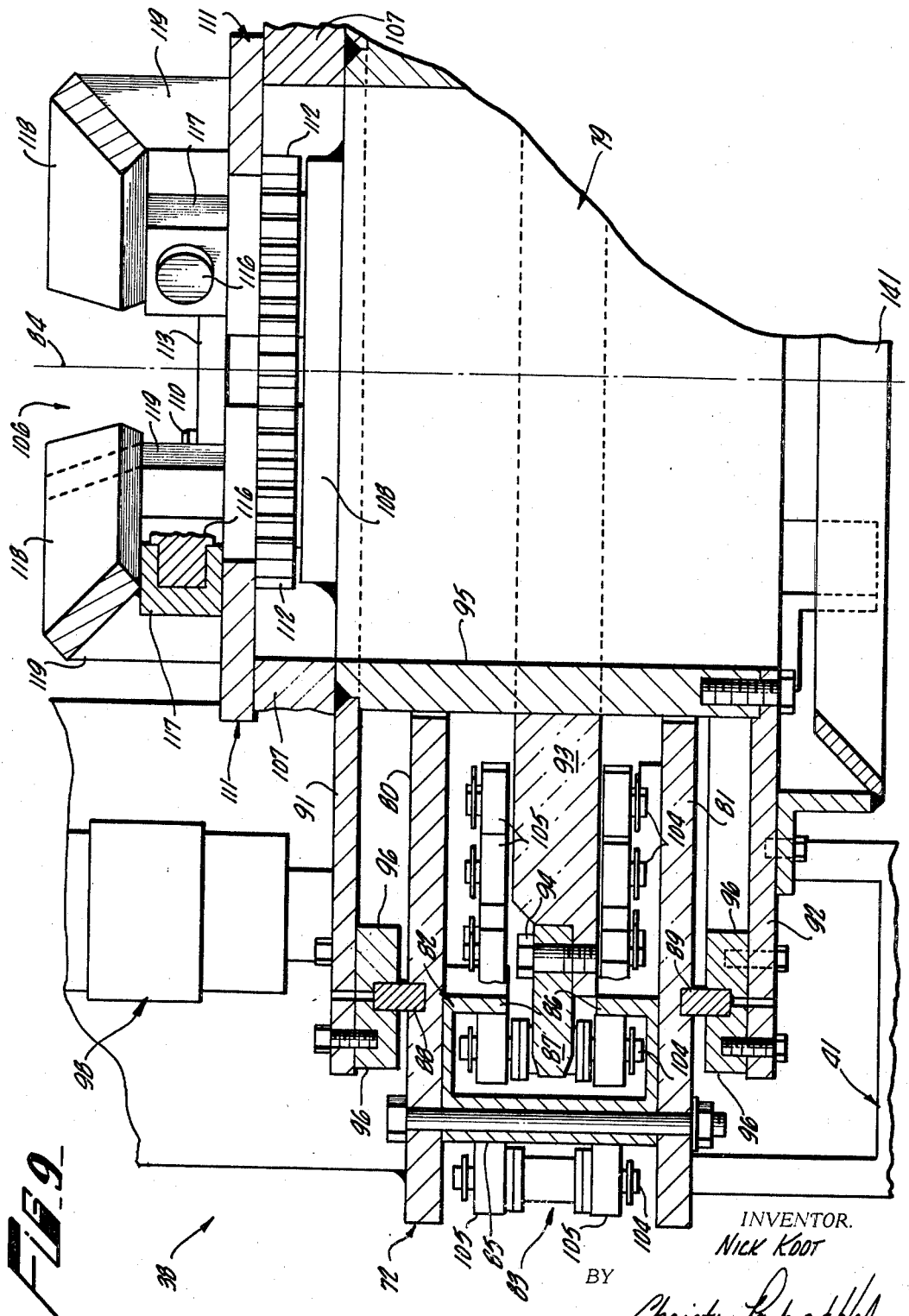

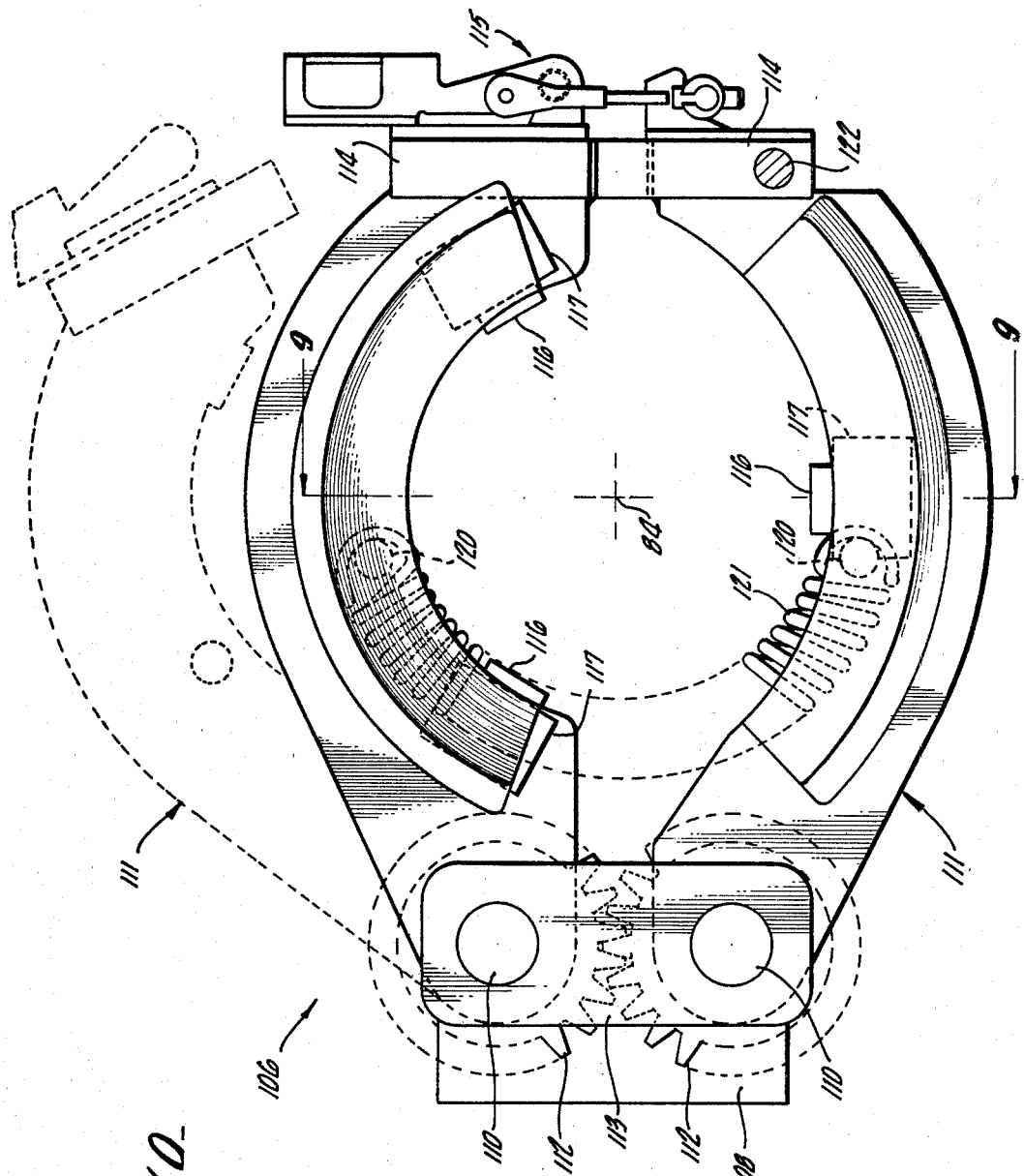

Nov. 11, 1969    N. KOOT    3,477,527
KELLY AND DRILL PIPE SPINNER-STABBER
Filed June 5, 1967    8 Sheets-Sheet 7
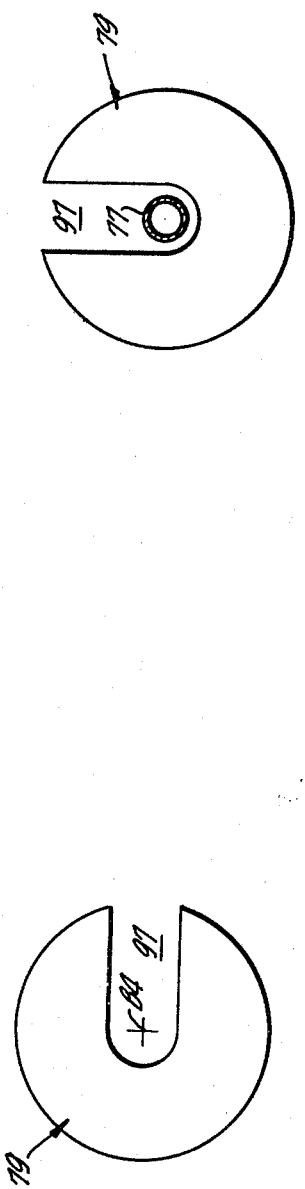
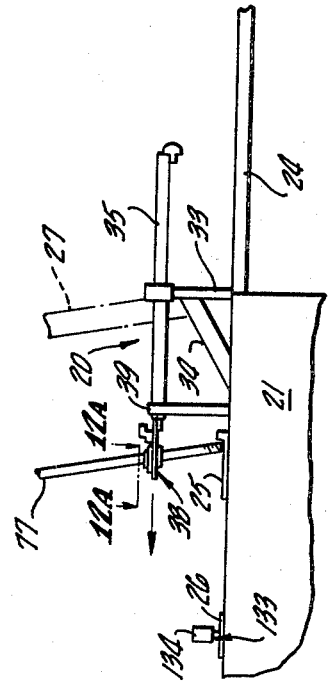
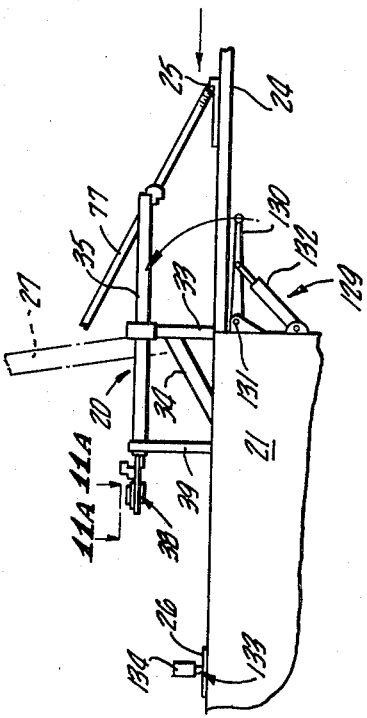

Nov. 11, 1969     N. KOOT     3,477,527
KELLY AND DRILL PIPE SPINNER-STABBER
Filed June 5, 1967     8 Sheets-Sheet 8

INVENTOR.
NICK KOOT
BY
Christie, Parker & Hale
ATTORNEYS

United States Patent Office 3,477,527
Patented Nov. 11, 1969

3,477,527
KELLY AND DRILL PIPE SPINNER-STABBER
Nick Koot, South Laguna, Calif., assignor to Global Marine Inc., Los Angeles, Calif., a corporation of Delaware
Filed June 5, 1967, Ser. No. 643,645
Int. Cl. E21b *17/00;* E21c *19/00*
U.S. Cl. 175—85             21 Claims

ABSTRACT OF THE DISCLOSURE

A drill pipe and kelly handling mechanism for gripping a pendulously supported drill pipe or kelly adjacent its lower end and for moving the same into or out of alignment with a drill hole in a drilling rig. The mechanism includes a rotary handling head for rotating a pipe joint or kelly to make up or break a connection in a drill string, the head being mounted for reciprocation toward and away from a base for the mechanism. The mechanism has a "pass-through" arrangement to facilitate movement of a pipe to over the drill hole from externally of the drilling rig.

BACKGROUND OF THE INVENTION

Field of the invention

This invention relates to the drilling of oil wells and the like, and more particularly, it relates to apparatus for handling a kelly joint or a joint of drill pipe during the drilling operation.

Discussion of the prior art

During the drilling of an oil well by means of a rotary tool, a joint of pipe must be added to the drill string each time the tool advances an amount equal to the length of a joint of pipe. In the past, substantially all aspects of the procedure of adding a new joint to the drill string were performed manually. Since the kelly joint, also known simply as a "kelly," and the joint of pipe to be added to the drill string are heavy and cumbersome pieces of equipment, particularly where drilling is carried out to extreme depths, the process of adding a joint to a drill string involves hard physical labor. Moreover, this procedure can be dangerous where the drilling rig is exposed to wind. The likelihood of injury is especially high where the oil well is being drilled from a floating vessel which may experience rolling, pitching and heaving motions.

The procedure by which a new joint of drill pipe is inserted into a drill string involves the removal of a kelly joint from the upper end of the drill string. The kelly joint conventionally is a hexagonally configured length of tubing which cooperates with a similarly configured opening in a rotary table mounted to the drill rig floor below the derrick of the drilling rig. To insert a new length of drill pipe in the drill string, the kelly is raised sufficiently through the rotary table to expose the upper end of the first length of drill pipe immediately below the kelly. The drill string is then secured in the rotary table and the kelly is removed from the drill string. As the kelly is moved manually from the rotary table, it is suspended in a pendulous manner in the derrick. After the kelly has been cleared from the upper end of the drill string, it is connected to a new joint of drill pipe. The combination of the kelly and pipe joint is moved manually into position over the rotary table, the combination also being suspended pendulously during such movement. The lower end of the new joint of drill pipe is screwed into the end of the drill string secured in the rotary table.

The process of making up the new joint may include the use of a power tong which is engaged with the lower end of the new joint to rotatively drive the new joint relative to the drill string as the screw coupling between the new joint and the string is made up. A power tong usually is a quite massive piece of machinery, which, like the kelly and the joint itself, is suspended within the derrick for manual movement toward and away from the rotary table.

After the new joint has been secured to the drill string, the extended string is lowered into the hole and drilling is resumed.

Whenever it is necessary to remove a drill bit from the lower end of the drill string, the procedure described above is performed in reverse a sufficient number of times to provide access to the drill bit. In this case, however, several joints of pipe may be removed as a unit from the drill string.

SUMMARY OF THE INVENTION

This invention provides efficient and effective apparatus for safely and rapidly moving a kelly or joint of drill pipe toward or away from a rotary table during the procedure in which a pipe joint is either added to or removed from a drill string. The apparatus preferably is used to conduct the kelly or drill pipe joint to or from a permanent or temporary storage location therefor. This apparatus, referred to herein as a kelly or pipe spinner-stabber, is also useful to rotate a pipe joint in making or breaking a screw coupling in the drill string. The spinner-stabber assures that the kelly or pipe joint engaged therewith will be positioned exactly where it is desired regardless of the effects of wind and sea conditions on the drilling rig. Use of this apparatus eliminates the need for hard physical labor in moving pendulously supported pieces of equipment within a drilling rig. While the spinner-stabber has utility in land-based drilling operations, the benefits provided by this invention are particularly significant in connection with the drilling of oil wells and the like from floating vessels.

Generally speaking, this invention provides apparatus for handling drill pipe and the like in a drill rig during drilling operations. The apparatus includes a base. A pipe guiding and driving head is provided for receiving a length of drill pipe therein, and for rotating the pipe about its length. The apparatus also includes selectively operable means mounting the driving and guiding head to the base; this means is operable for reciprocating the head toward and away from the base along a predetermined line. Preferably, the predetermined line is a horizontal line which has one end disposed over the axis of a rotary table in the drill rig.

DESCRIPTION OF THE DRAWINGS

The above-mentioned and other features of the present invention are more fully set forth in the following detailed description of a presently preferred embodiment of the invention, the description being presented with reference to the accompanying drawings, wherein:

FIG. 1 is an elevation view of a spinner-stabber;

FIG. 2 is a fragmentary cross-sectional elevation view taken along line 2—2 of FIG. 1;

FIG. 3 is a plan view taken along line 3—3 of FIG. 1;

FIG. 4 is an enlarged cross-sectional elevation view taken along line 4—4 of FIG. 1;

FIG. 8 is a top plan view, with parts removed for the purposes of clarity, of the pipe guiding and driving head of the apparatus shown in FIG. 1;

FIG. 9 is an enlarged fragmentary cross-sectional elevation view taken along line 9—9 of FIG. 8;

FIG. 10 is a top plan view of a pipe clamping and locking mechanism mounted to the upper portion of the guiding and driving head as illustrated in FIG. 9;

FIG. 11 and FIG. 11A illustrate a stage in the operation of the spinner-stabber;

FIGS. 12 and 12A illustrate another stage of the operation of the spinner-stabber;

DETAILED DESCRIPTION OF THE PREFERRED EMBODIMENT

Figure 6:
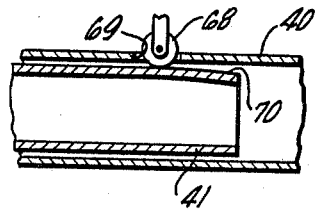
FIG. 6 is an enlarged cross-sectional elevation view of a portion of the structure shown in FIG. 1.

For the purposes of most clearly illustrating the utility and advantages of the present invention, the invention is described herein in the environment of a drilling rig mounted on a floating vessel, the vessel being equipped with a pipe racker and pipe transport mechanism of the type described and illustrated in U.S. Patent 3,083,842 issued Apr. 2, 1963. In such an environment, the drilling vessel preferably has a central drilling well extending through the hull approximately amidships along the centerline of the vessel. The drilling rig, including a derrick 27, is mounted to the vessel over the central well. The floor 21 of the drilling rig is supported above the main deck of the vessel on suitable truss-like frames. A rotary table 26 is mounted in the drilling rig floor over the center of the drilling well. The pipe racker and transporter device preferably extends forwardly from the drilling rig along the centerline of the vessel, the racker apparatus being mounted on a suitable framework above the main deck of the vessel. The racker is provided for storing lengths of drill pipe in such a manner that the pipe sections cannot shift as the vessel rolls, pitches, and heaves. It is noted that, in land-based drilling operations, it is conventional to store drill pipe vertically within the drill rig derrick, the racker of Patent 3,083,842 normally not being used.

A spinner-stabber 20 for handling drill pipe and kelly joints is shown in FIG. 1 mounted to the forward edge of drilling rig floor structure 21 along the longitudinal centerline 22 (FIG. 3) of a floating drilling vessel. The spinner-stabber is mounted within a pipe joint guide frame 23 (see FIG. 7) over a guide rail assembly 24 for a pipe transport skate 25 (see FIG. 11) of a pipe racker assembly (not shown); the skate rail assembly extends forward from the rig floor over the main deck of the vessel along the vessel centerline. The skate rail assembly also extends rearwardly of the spinner-stabber toward a rotary table 26 to adjacent a mousehole (not shown) which is located in the rig floor forwardly of the rotary table along the vessel centerline for receiving a single length of drill pipe in an essentially vertical attitude.

Figure 7:
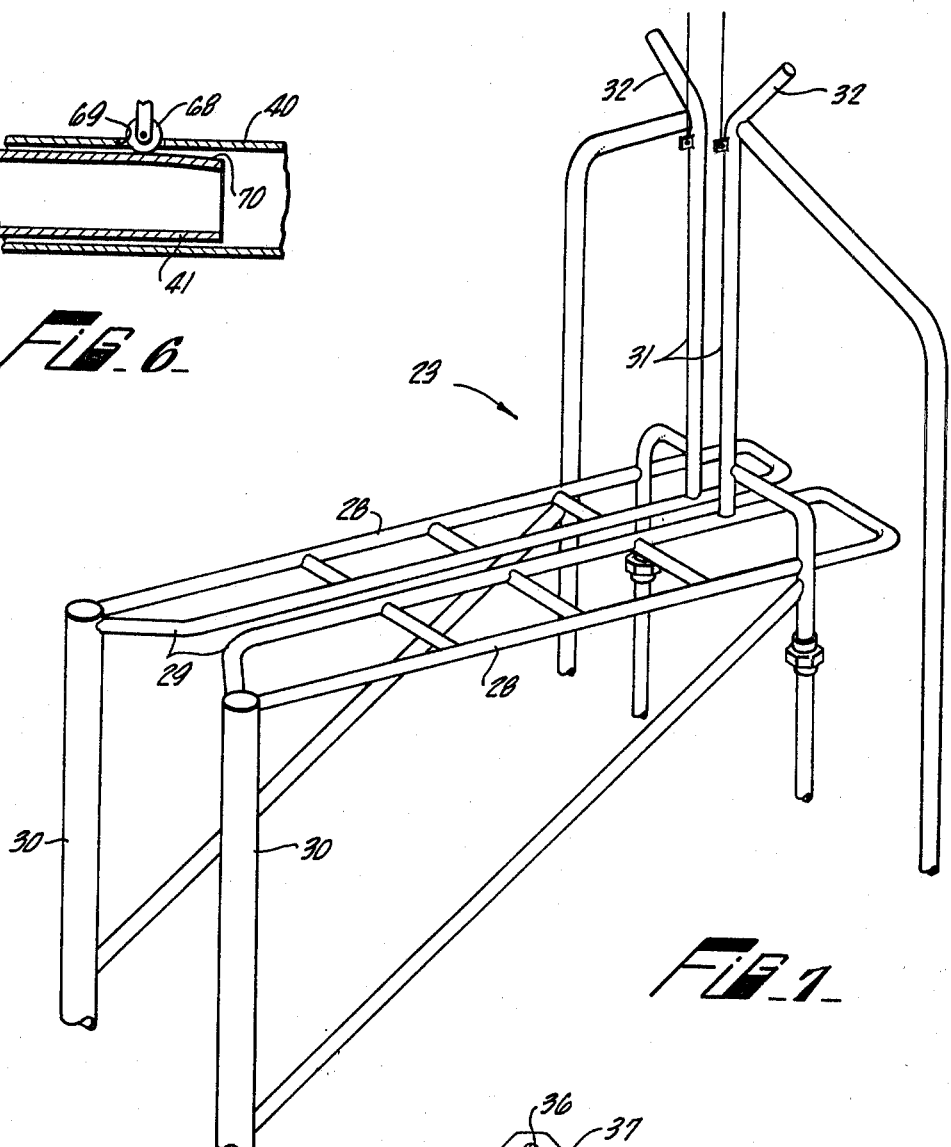
FIG. 7 is a perspective view of a pipe guide frame with which the spinner-stabber preferably is used, as illustrated in FIG. 1.

As shown in FIG. 7, guide frame 23 is defined by lengths of pipe and includes two elongate horizontal frameworks 28 disposed about nine feet above the rig floor. The frameworks are spaced parallel to each other on opposite sides of centerline 23. The adjacent edges of the frameworks flare away from each other, as at 29, at the rear of the frame to a pair of heavy vertical stanchions 30. At the front of the frame, a pair of pipe lengths 31 extend upwardly from respective frameworks 28 to outwardly flared upper ends 32. The guide frame is provided to prevent a pipe joint or series of pipe joints being transferred to the derrick from the racker from moving undesirably in response to ship motions.

The spinner-stabber has a base which includes a pair of structural upright support members 33 which extend parallel to each other on opposite sides of centerline 22 adjacent pipes 31 of frame 23. The upper ends of members 33 are located below frameworks 28. The support members are braced by suitable struts 34. As shown in FIG. 4, the upper portion of each member 33 is open in a fore-and-aft direction to permit the passage of an extensible telescoping tube assembly 35 through it, each tube assembly being hung from the upper end of the support member by a hanger pin 36 journalled by suitable lugs 37 secured to the tube assembly. The hanger pins are arranged so that the tube assemblies are movable about a common horizontal axis transverse to the lengths of the tube assemblies. The telescoping tube assemblies are symmetrical relative to the vessel centerline, but this aspect of the invention is not shown in its entirety in FIG. 3 for the sake of simplicity of illustration.

The telescoping tube assemblies extend rearwardly from support members 33 to a guiding and driving head 38. The tube assemblies also extend forwardly of the support members. The rear ends of the tube assemblies are received and supported by respective ones of a pair of upright stanchions 39 mounted to the rig floor structure.

As shown best in FIG. 4, each telescoping tube assembly includes an outer elongate hollow tube 40 of rectangular cross-section and a similarly configured hollow elongate inner tube 41. Each outer tube is open at its ends and has a slot 42 formed through its lower wall from just adjacent its forward end 43 along a major portion of its length to rearwardly of the corresponding hanger pin 36 but substantially short of the rear end 44 thereof. Each inner tube is movably supported within its outer tube for reciprocation relative to the outer tube by a roller 45 mounted to the underside of the outer tube between the rear end of slot 42 and the rear end of the outer tube. The roller engages the lower surface of the inner tube through a suitable aperture (not shown) formed in the outer tube. The mounting of each inner tube to its outer tube also includes a roller 46 carried by the inner tube at its forward end and engaging the inner upper surface of the outer tube; this roller in one of the tube assemblies preferably has a circumferential groove to provide clearance for the roller of the forward limit switch described below. Guiding and driving head 38 is mounted to and supported by the rear ends of the inner tubes to be reciprocated toward and away from the base of the spinner-stabber as the inner tubes are moved relative to the outer tubes.

The inner tubes are driven in tandem relative to the outer tubes by operation of a drive mechanism which includes a reversible hydraulic motor 47 mounted to the drilling rig floor adjacent the lower ends of upright members 33. The motor drives a chain 48 which is engaged with a drive sprocket 49 for a shaft 50 which extends transversely of the elongate extent of the telescoping tube assemblies below the rail assembly for skate 25. The shaft is rotatably mounted in suitable bearings 51 located just to the rear of the lower ends of members 33.

Since the remaining structure of the drive mechanism for the tube assemblies is identical for each tube assembly, such structure is illustrated in the accompanying drawings only with respect to one of the tube assemblies.

A chain drive sprocket 52 is secured to shaft 50 (see FIG. 2) below each slot 42 of each telescoping tube assembly, and a length of timing chain 53 is engaged with each such sprocket. As shown best in FIG. 1, each length of chain 53 has one end secured to a lug 54 which extends forwardly from the structure which mounts roller 46 to the corresponding inner tube, the lug extending out the open forward end of the outer tube when the tube assemblies are retracted. The chain extends from lug 54 around an idler sprocket 55, mounted adjacent the front end of the tube assembly, to an idler sprocket 56 located below hanger pin 36. From sprocket 56, the chain passes downwardly to around drive sprocket 52, and then upwardly to another idler sprocket 57 located rearwardly of sprocket 56. The chain then passes rearwardly to around another idler sprocket 58 located rearwardly of slot 42, and then forwardly to its other end which is secured to a lug 59 which depends from the forward end of the inner tube through slot 42.

Chain idler sprockets 55, 56 and 58 are mounted on shafts carried by and between a pair of brackets 60 secured to the outer tube of the corresponding tube assembly. The brackets are disposed parallel to and on opposite sides of slot 42 and extend from the front end of the outer tube to rearwardly of the rear end of the slot. Idler sprocket 57 is rotatably mounted on a shaft 61 (see FIGS. 1 and 4) mounted between the rear ends of a pair of link members 62 which are pivotally mounted at their front ends to a shaft 63 for idler sprocket 56. A lever 64 has its upper end securely connected between the link members intermediate shafts 61 and 63. The lever extends downwardly adjacent the rear of upright member 33 into engagement adjacent its lower end with an adjustable-length stop post 65 (see FIG. 5).

Depending on the direction in which motor 47 is operated, the inner tubes of the telescoping tube assemblies are driven in tandem to either extend or retract relative to the outer tubes. As the inner tubes extend, lugs 59 move in slots 42 from adjacent sprockets 55 to adjacent sprockets 58.

The forward and rear limits of travel of the inner tubes are controlled by operation of hydraulic limit switches 66 and 67 mounted to one of the telescoping tube assemblies adjacent the ends of slot 42. Limit switches need be used on only one of the tube assemblies since the operation of the assemblies is linked together by common drive shaft 50. As shown in FIG. 6, each limit switch includes a reciprocable actuator member which carries a follower roller 68 engaged with the inner tube through a hole 69 in outer tube 40. The forward end of the inner tube, preferably along the upper surface of the inner tube, defines a cam ramp 70.

The normal position of the actuator of switch 66 is extended. Thus, when the inner tube moves sufficiently far forward in its outer tube to cause the actuator to rise its set amount, the switch closes to cease operation of motor 47. Conversely, the normal position of the actuator of switch 67 is raised, and extension of the actuator due to movement of the inner tube past its follower roller operates the switch to cease operation of the motor. Thus, the switches define the limits of reciprocal travel of the inner tubes and of head 38.

The limit switches are coupled to motor 47 via suitable hydraulic ducting 71 and appropriate additional control devices not shown.

Telescoping tube assemblies 35 are interconnected only by pipe guiding and driving head 38. The guiding and driving head is constructed so that a length of pipe can be passed entirely through the length of the spinner-stabber.

As shown in FIG. 8, head 38 includes a drive side support frame 72 and a guide side support frame 73; frame 72 is more complex structurally than frame 73 and thus frame 73 is not shown in great detail in the drawings. Frame 73 is secured to the rear end of right inner tube 41 by a core 74 fitted into the rear end of the tube and secured in place by a bolt 75. Frame 72 is similarly mounted to the rear end of the left one of inner tubes 41. Frames 72 and 73 extend generally parallel to each other and are spaced from each other to define a passage 76 between them, and between the telescoping tube assemblies, through which a joint 77 of drill pipe may be moved. The passage is spanned only by a door 78 and by a circular, radially slotted hub assembly 79 rotatably supported between frames 72 and 73.

Frame 72 includes parallel, horizontal top and bottom plates 80 and 81 (see FIG. 9) between which is mounted a guide member 82 for a loop of hub assembly drive chain 83. As seen in FIG. 8, guide member 82 is curved concentric to an axis of rotation 84 of the hub assembly. The guide member has a web portion 85 extending between the top and bottom plates and a pair of aligned flanges 86 spaced toward the hub assembly from the web portion. The flanges are arranged to have clearance between each other for the passage of the toothed rim of a hub drive sprocket 87 between them toward the web portion. The surfaces of the guide member web portion and flanges disposed away from axis 84 define portions of cylinders concentric to the axis.

A bearing guide 88 for the hub assembly is mounted to the upper side of top plate 80 and extends along the plate in an arc concentric to axis 84; a similar bearing guide 89 is mounted to the underside of bottom plate 81.

Frame 73 includes structure essentially identical to the structure of frame 72 described above. Frame 73 includes an element 90 which is identical to guide member 82, but which is a dummy in frame 73 since it is provided in frame 73 primarily as a structural spacer between the frame top and bottom plates.

Hub assembly 79 includes a top plane 91, a bottom plate 92, a sprocket support ring 93 to which sprocket 87 is secured as by bolts 94, and a central cylindrical core sleeve 95 disposed concentric to axis 84. Sleeve 95 has an outer diameter only slightly less than the maximum distance betweeen frames 72 and 73 in a direction normal to the length of passage 76. The inner diameter of the core sleeve determines the capacity of the spinner-stabber in terms of the size of a pipe joint or kelly which can be handled by the device. The hub assembly top and bottom plates are fixed to the core sleeve to extend parallel to the top and bottom plates, respectively, of frame 72 and 73 above and below, respectively, these frame plates, The hub drive sprocket support ring is fixed to the core sleeve between plates 91 and 92.

Elements 91, 92, 93 and 95 rotate as a unit about axis 84 when head 38 is operated. The hub assembly is movably engaged with bearing guides 88 and 89 by annular recessed guide and bearing rings 96 engaged with three sides of the frame-mounted bearing guides. A pair of rings 96 are mounted to the underside of the hub top plate to engage the inner, outer, and upper surfaces of guide 88. A second pair of rings 96 are mounted concentric to each other on the upper side of the hub assembly bottom plate for sliding engagement with the inner, outer and lower surfaces of guide 89.

As shown in FIG. 8, the hub assembly is radially slotted along its entire length to provide a passage 97 from the interior of the core sleeve to the outer diameter of the hub assembly. The width of passage 97 preferably is equal to the minimum distance between frames 72 and 73 and preferably is equal to the inner diameter of sleeve 95. Except for the passage, the configuration of the hub assembly is circular and has a diameter substantially greater than the width of the passage.

As shown in FIGS. 8 and 9, a reversible hydraulic motor 98 is mounted to the upper surface of support frame 72 adjacent its supporting tube member 41. A suitable manually operated control unit 99 for the motor, provided with an operating handle 100, is mounted to the tube member adjacent the motor. The motor drives a chain drive sprocket 101 located within frame 72 between top and bottom plates 80 and 81, respectively. Chain loop 83 is engaged between the drive sprocket and an idler sprocket 102 mounted adjacent the rear or unsupported end of frame 72 between the top and bottom plates for rotation about a shaft 103. The run of chain lying adjacent to passage 76 is engaged with the surfaces of guide member flanges 86 as shown in FIG. 9. The other run of the chain loop between the drive and idler sprockets is engaged with the surface of guide member web portion 85 lying away from hub assembly axis 84, also as shown in FIG. 9.

Chain 83 is of the timing type. Each of the link pins 104 of the chain is provided with a roller 105 at each end thereof. The rollers engage the cylindrical surfaces of a guide member web flange portion. The guide member is configured, in cooperation with the positioning of the axes of rotation of the drive and driven sprockets, so that the run of chain adjacent passage 76 follows and arc coinciding with the curvature of the periphery of hub drive sprocket 87, the teeth of sprocket 87 being engaged with the links of chain 83 for rotation of the hub drive sprocket in response to movement of the chain. The arc defined by the curvature of that portion of the chain engaged with flanges 86 is of sufficient extent that at least four teeth of sprocket 87 on either side of passage 97 are engaged with the chain when the hub assembly is positioned so that passage 97 extends at right angles to the length of passage 76. As a result, there is always sufficient purchase between the chain and sprocket 87 to assure that the hub assembly is driven without slippage, tooth fracture or chain damage as the hub assembly is rotated any desired number of times about its axis.

A clamp assembly 106 is shown in FIG. 9 mounted to hub assembly 79 for rotation with the hub assembly about axis 84. FIG. 10 is a top plan view of the pipe clamp assembly. The clamp assembly includes a pair of stand-off and jaw bearing blocks 107 secured to the hub assembly top plate on opposite sides of passage 97 and disposed radially of axis 84. A gear bearing plate 108 is fixed to the hub assembly top plate transversely of the elongate extent of passage 97 adjacent the inner end of the passage. Plate 108 provides bearing apertures 109 for shafts 110 about which the jaw members of the bearing assembly pivot as the clamp assembly is operated.

As seen best in FIGS. 9 and 10, the clamp assembly includes a pair of support shafts 110, one for each of a pair of jaw members 111 of the clamp assembly. The jaw members are of arcuate configuration, as shown in FIG. 10, and journal shafts 110 at their forward ends. Circumferentially of the shafts, each jaw member carries a gear 112 fixed to the corresponding jaw member for rotation with the jaw member about the shaft. The gears are meshed with each other, as shown, so that movement of one of the jaw members about its support shaft produces a corresponding movement of the other jaw member about its pivot shaft. The gears bear rotatably against the upper surface of plate 108. The upper ends of shafts 110 are yoked together by a connecting link 113.

A kiss block 114 is mounted to the unsupported end of each jaw member for engagement with the other kiss block when the jaw members are in their closed position, illustrated in solid lines in FIG. 10. The opposing faces of the kiss blocks define a mating tongue-and-groove configuration to facilitate proper mating of the blocks. An adjustable over-center toggle latch assembly 115 is mounted between the kiss blocks, the hook of the latch assembly being connected to the face of one of the kiss blocks, the toggle mechanism being secured to the other of the kiss blocks. The toggle latch is provided for locking the jaw members into their closed position, as shown in FIG. 10.

Three knurled, hard surfaced, pipe gripping die buttons 116 are secured to the upper surfaces of the jaw members in suitable mounting blocks 117. The die buttons are positioned so that they are 120° apart about axis 84 when the clamp assembly is in its closed condition. An arcuate upwardly and outwardly flared guide 118 is mounted to each jaw assembly and is supported on the upper surfaces of blocks 117 and by suitable support posts 119.

A pin 120 depends from the underside of each of jaw members 111 substantially midway along the length of the jaw member. The pins are arranged so that, when the clamp assembly is in its closed condition, the pins are disposed just short of diametral alignment with each other on the side of axis 84 toward shafts 110. A coil spring 121 is secured between the pins for biasing the jaw members into an open condition (shown in dashed lines in FIG. 10) when a pipe joint is not in position within the clamp assembly.

A closing handle 122 is secured to the unsupported end of one of jaw members 111, preferably the jaw member which lies adjacent frame 72 when the hub assembly is in the position shown in FIG. 8; this handle preferably is located on this jaw member since the operator of the device preferably is standing adjacent frame 72 for operation of hydraulic control 99 of motor 98.

Spring 121 in its relaxed position biases the jaw members into the position illustrated in dashed lines in FIG. 10. However, when a pipe joint, such as pipe joint 77, is moved into the open jaw members to engage spring 121, the spring is caused to bow around the pipe joint. In its bowed condition, the spring acts to move the jaw members approximately into their closed position. The operator of the spinner-stabber then need only grasp handle 122 and move the kiss blocks into engagement sufficiently that toggle assembly 115 can be engaged across the kiss blocks. When the jaw members are fully closed about a pipe joint received therein, dies 116 engage the outer surface of the pipe joint sufficiently forcefully to secure the pipe joint from rotation relative to the clamp assembly about axis 84.

It should be apparent that the structure of the clamp assembly is tailored to a particular size of drill pipe. If it is desired to use the spinner-stabber to handle various sizes of drill pipe, suitable additional clamp assemblies are provided in sizes corresponding to the sizes of drill pipe to be handled. It is a simple matter to substitute one clamp assembly for another on hub assembly 76. This substitution may be accomplished merely by removing link member 113 from shafts 110 after removal of suitable retainer rings (not shown) from around the respective shafts. Thereafter, the jaw members are merely lifted from the shafts, the jaw members of the jaw assembly to be substituted are slipped into place over the shafts, and the link plate is then reinstalled on the shafts.

As noted above, a door 78 is provided as a part of head 38 between the unsupported ends of frames 72 and 73. As shown in FIG. 8, the door includes an elongate bar 123 secured at its end adjacent frame 72 to shaft 103 for rotation with the shaft; rotation of the bar with shaft 103 does not disturb operation of sprocket 102 since this sprocket is merely an idler and its mounted for rotation about shaft 103. At its other end, the door bar carries a pair of conically tapered plugs 124 which mate with correspondingly configured recesses 125 in respective ones of a pair of receptacle blocks 126 secured to the unsupported end of frame 73. An operating lever 127 is secured to shaft 103 for rotation with the shaft and, when the door is in its closed condition, extends beyond the unsupported end of frame 72. The door is biased into its closed condition by an elongate resilient member 128 connected between frame 72 adjacent chain drive sprocket 101 and bar 123 adjacent shaft 103. Preferably, member 128 is a length of elastomeric material which elongates sufficiently to allow the door to be swung into a position entirely clear of passage 97 of the hub assembly. Normally, however, the resilient member biases the door into its closed condition so that conical plugs 124 mate in their blocks to maintain the proper spacing between the unsupported ends of frame 72 and 73. The door is opened as the operator of the spinner-stabber moves lever 127 clockwise about shaft 103.

Further structural features of spinner-stabber 20 will be more readily apparent once the preferred mode of operation of the spinner-stabber is understood. FIG. 11 illustrates the spinner-stabber mounted to the floor structure of a drilling rig of a floating drilling vessel provided with a pipe racker having guide rail assembly 24 and pipe transfer skate 25. As described in Patent 3,083,842, the pipe racker includes a pipe elevating mechanism adjacent the drilling rig end of rail assembly 24. The pipe elevating mechanism includes an arm 130 pivoted at 131 to the forward side of the rig floor and driven by an extensible ram 132. The normal position of arm 130 is below and parallel to the underside of the skate rail assembly. When a pipe point, or a small number of pipe joints preassembled into a drill string section of desired length, is moved sufficiently far rearwardly along the rail assembly by skate 25 so that the rear end of the joint lies above the unsupported end of arm 130, ram 132 is operated to move the end of the elevator arm through an opening in the underside of the rail assembly into engagement with the rear end of the pipe joint. The rear end of the pipe joint is thus raised in the manner illustrated in FIG. 11 so that it can be engaged with a suitable line connected to a travelling block suspended in derrick 27. As the pipe joint is raised, it passes between upright members 31 of pipe guide frames 23. Continued rearward motion of skate 25 and raising of the elevated end of the pipe joint brings the pipe joint more and more into a vertical position within guide frame 23. As or before this procedure is carried out, spinner-stabber 20 is operated to retract pipe guiding and driving head 38 toward the base of the spinner-stabber. Also, head 38 is operated so that hub assembly 79 is positioned with passage 97 opening toward telescoping tube assemblies 35. As the pipe is moved into a nearly vertical condition, the pipe joint passes down the passage 76 between the telescoping tube assemblies toward head 38. As soon as the pipe joint has entered as far as it can into passage 97, motor 98 is operated sufficiently to cause the hub assembly to rotate 90° from its position, illustrated in FIG. 11A, to the position shown in FIG. 12A.

The movement of pipe joint 77 into the position shown in FIG. 12 is accomplished with little manual effort and the pipe joint is always constrained during this procedure from undesirable movements, such constraint being provided by the structure of the skate and guide frame 23. Subsequent movement of pipe joint 77 from the position shown in FIG. 12 toward the rotary table is obtained by operation of the spinner-stabber. Preferably the pipe is moved from the position shown in FIG. 12 to a mousehole located adjacent the spinner-stabber and the rotary table along centerline 22.

The upper end of drill strink 133 carries an internally threaded pipe coupling 134, the lower end of joint 77 being threaded for cooperation with the coupling.

As noted, it is necessary, periodically during drilling operations, to add a length of drill pipe to the drill string. After the spinner-stabber has been operated to place a pipe joint in the mousehole, and after the drill string has been raised sufficiently to expose the coupling at the lower end of the kelly, the string being chocked in the rotary table in such position, the spinner-stabber head is moved into engagement with the kelly. The kelly may be unscrewed from the drill string by operation of head 38 to rotate the kelly counterclockwise, or, alternatively, the drill string may be driven clockwise by the rotary table while the kelly is held stationary in head 38. In any event, after the coupling of the kelly to the drill string has been disconnected, the spinner-stabber is operated to align the kelly with the pipe joint in the mousehole. The kelly is then dropped or stabbed through head 38 into engagement with the pipe joint, the spinner-stabber functioning as a guide for such movement of the kelly. When the kelly and the mousehole joint are registered, hub assembly 79 is rotated to make up the connection between the kelly and the joint. The kelly and pipe joint are then raised through head 38 until the lower end of the pipe clears the mousehole. Thereafter, the spinner-stabber is operated to move the kelly-joint combination to over the table. The insertion of the new pipe joint into the drill string is completed as the hub assembly is rotated several times to screw the threaded lower end of the pipe into the coupling carried by the upper end of the drill string.

Figure 13:
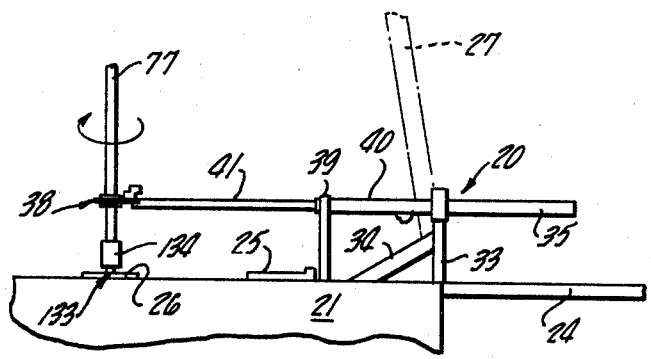
FIG. 13 illustrates still another stage in the operation of the spinner-stabber.

During movement of the pipe joint to the position shown in FIG. 13, the upper end of the joint is suspended from a travelling block in the drilling rig. Because the lower end of the pipe is held in head 38 during the movement of the lower end of the joint toward the rotary table, this operation can be carried out in absolute safety regardless of the prevailing wind and sea conditions. Also, alignment of the lower end of the pipe joint with the drill string coupling can be carried out much more rapidly than by manual labor because the constraint of the pipe joint in the spinner-stabber assures that the threaded lower end of the joint will be properly aligned with the coupling when the telescoping tube assembly has been extended to the limit associated with switch 67.

Figure 14A:
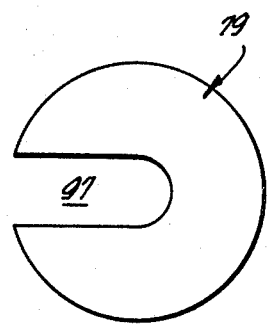
FIGS. 14 and 14A illustrate yet another in the operation of the spinner-stabber.
Figure 14:
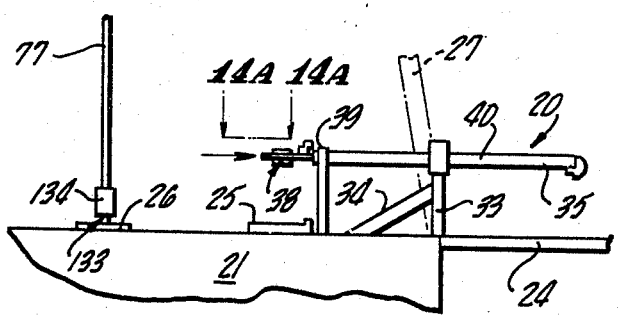

After pipe joint 77 has been secured to drill string 133, as shown in FIG. 14, the hub assembly is rotated into the position shown in FIG. 14A, door 78 is opened and head 38 is moved away from the rotary table by retraction of the telescoping tube assemblies. The chocks which hold the drill string in position in the rotary table are then removed, the drill string is lowered through the rotary table until the upper end of the drill string is just above the table, and the drilling procedure is then resumed.

If the rathole in which the kelly is temporarily stored while a bit is being run into or out of the drill hole is located along the line of reciprocation of head 38 between the rotary table and stanchions 39, the spinner-stabber may be used to move the kelly into alignment with the drill string and to secure the kelly to the drill string.

The spinner-stabber may also be used to disconnect a pipe joint from the drill string. With clamp assembly 106 secured about the uppermost joint in the string and the rotary table held stationary, the hub assembly may be driven counterclockwise about axis 84 to unscrew the joint from its coupling. Alternatively, the joint may be held stationary in the spinner-stabber and the rotary table operated to break the coupling.

It will be apparent that, while pipe joint 77 is being screwed into pipe coupling 134, it is necessary for the pipe joint to move vertically as the threads of the coupling are securely engaged with each other. It is also apparent from the foregoing description, that the pipe joint does not move readily axially relative to head 38 if die buttons 116 are to grip the pipe joint securely enough to assure rotation of the joint in response to operation of motor 98. Accordingly, spinner-stabber 20 is constructed so that the telescoping tube assemblies can pivot about hanger pins 36 as the pipe coupling is made up. This movement of the tube assemblies also permits the spinner-stabber to accommodate the increase in moment which is imparted to the device as the tube assemblies are extended from the retracted condition shown in FIG. 1. To this end, stanchions 39, which engage outer tubes 40 adjacent their rear ends, are provided with spring assemblies 135 (FIG. 1). Each spring assembly includes an abutment plate 136 (see FIG. 3) mounted on a vertically disposed reciprocal pin 137. The abutment plate engages the under surface of the respective one of tubes 40. The abutment plate and the pin are biased upwardly relative to the stanchion by a spring 138 engaged circumferentially of the pin between the pin and the stanchion structure. The range of travel of the pin vertically relative to the stanchion is approximately 6 inches.

The springs have stiffness sufficient to produce an approximately ½ inch drop in the rear ends of outer tubes 40 as the head is extended from the position shown in FIG. 1 to over the rotary table. As a pipe joint held in head 38 is screwed into coupling 134, the head drops another two inches or so. The spring assemblies support the tube assemblies during such vertical motion of the head.

As described above, the drive sprockets 52 for chain 53 of the telescoping tube assemblies rotate about an axis fixed relative to the base of the spinner-stabber, whereas sprockets 55, 56 and 58 are rotatable about axes fixed relative to the telescoping tube assemblies and, therefore, are movable relative to the spinner-stabber base structure. As noted above, the rear ends of tubes 40 drop approximately ½ inch as the tube assemblies are extended, such movement occurring as the chain is being driven to produce such extension. If it were not for the nature of the mounting of idler sprocket 57 relative to the base of the spinner-stabber, it is possible that, due to the variation in tension of the chain, one or both of the chains provided for driving the telescoping tube assemblies might jump from their sprockets as the tube assemblies are extended or retracted.

Figure 5:
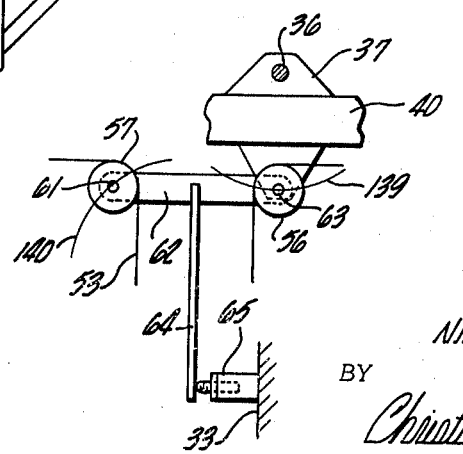
FIG. 5 is a schematic view of a portion of the movement of the the structure shown in FIG. 1.

The geometry of the mounting of idler sprockets 56 and 57 relative to the base of the spinner-stabber is arranged so that the effective tension of the chain throughout extension or retraction of the telescoping tube assembly is essentially constant. FIG. 5 illustrates this geometry in schematic form. Let it be assumed that the tube assemblies are to be extended their full amount from their retracted condition. During such extension, the tube assemblies pivot counterclockwise about hanger pins 36, with the result that shaft 53 of idler sprocket 56 moves to the right along arc 139. Sprocket 57, however, is rotatable about shaft 61 which is carried by link members 62, which link members are pivoted about axis 63. The lower end of lever 64 abouts stop post 65 which is fixed in its adjusted position relative to upright members 33. Thus, as shaft 63 moves to the right along arc 139, shaft 61 of sprocket 57 moves to the right along arc 140. Arc 140 is not concentric to shaft 63 since this shaft must move to produce movement of shaft 61. The distances from the point of engagement of stop post 65 and lever 64 to the axes of shafts 61 and 63, and between the axes themselves, is selected so that, as the telescoping tube assemblies pivot about hanger pins 36, the effective lengths of chains 53 remain unchanged. These relationships are also selected so that the tension of chains 53 may be selected to the amount desired by adjusting the length of stop posts 65 to vary the position of shafts 61 angularly of the normal positions of shafts 63. Preferably, the tension of chains 53 is adjusted so, when the proper tension is obtained, each of springs 138 is extended 3 inches from their fully compressed positions when the tube assemblies are retracted.

It may happen, during handling of a kelly or pipe joint in spinner-stabber 20, that the kelly or joint may become caught in the structure of head 38. The likelihood that this may happen is held to a minimum by the provision of guides 118 on jaw members 111 and by the provision of a similar arcuately curved, downwardly and outwardly flaring guide 141 mounted to the bottom plate of the hub assembly concentric to axis 84, as shown in FIG. 9. Nevertheless, in the event that a pipe joint or kelly may temporarily catch in the structure of the head, particularly when a drill string is being raised through the head, the pivotal movement of the telescoping tube assemblies about hanger pins 36 allows the head to move upwardly, thereby avoiding damage to the spinner-stabber structure. It is possible that the force producing such movement may be abruptly relieved from the head, with the result that the telescoping tube assemblies tend to slam downward into engagement with spring assemblies 135. Such rapid movement of the telescoping tube is impeded by a shock absorbing fluid dashpot assembly 142 which is pivotally connected between each telescoping tube assembly and its stanchion, as shown in FIG. 1.

From the foregoing, it is apparent that this invention provides effective, efficient, reliable and relatively simple apparatus for mechanically handling drill pipe joints and kelly joints during operations on an oil well drill rig floor. Since the need for manually moving heavy, pendulously supported loads within the drill rig is eliminated by the invention, it is apparent that the use of the spinner-stabber described significantly improves the safety conditions in such areas. The structure of the spinner-stabber permits a pipe joint to be moved entirely through the spinner-stabber, the pipe joint being constrained from undesired movements at all times in its passage through and while being handled by the spinner-stabber. It should also be apparent that the spinner-stabber may be used to advantage in land-based oil well drilling installations. The pass-through feature of the device contributes significantly to its utility on floating drilling vessels.

While the invention has been described above with reference to specific structure, this has been by way of example in furtherance of the foregoing description of a presently preferred embodiment of the invention. It should be apparent to workers having skill in the art to which this invention pertains that the structural arrangements described above may be varied and rearranged without departing from the scope of this invention. Accordingly, the foregoing description should not be considered as limiting the scope of this invention as defined in the following claims.

What is claimed is:

1. Apparatus for handling drill pipe and the like in a drill rig during drilling operations comprising:
   (a) a base,
   (b) a pipe driving and guiding head for receiving therein a length of drill pipe moved laterally thereinto and for rotating the pipe about the length thereof, and
   (c) selectively operable means mounting the head to the base and operable for reciprocating the head toward and away from the base along a substantially horizontal predetermined line,
   (d) the driving and guiding head being constructed to receive a length of drill pipe moved relative to the head in one direction along the predetermined line into engagement with the head and to discharge the length of drill pipe in the opposite direction along the predetermined line.

2. Apparatus according to claim 1 wherein the selectively operable means includes a pair of substantially identical extensible assemblies disposed parallel to each other on opposite sides of the predetermined line to define a passage therebetween along the line.

3. Apparatus according to claim 2 wherein each extensible assembly has a reciprocable end and the pipe driving and guiding head is mounted by said reciprocable ends and constitutes the only interconnection between the extensible assemblies across said passage.

4. Apparatus according to claim 2 including means for driving the extensible assemblies in tandem to move the head along the predetermined line.

5. Apparatus according to claim 4 wherein each extensible assembly includes a hollow outer tube mounted to the base and an inner tube disposed in the outer tube and mounted for movement axially of the outer tube, and the driving means for the extensible assemblies includes a chain coupled to each inner tube, a drive sprocket for each chain, and a drive motor coupled to both sprockets for chain driving rotation thereof.

6. Apparatus according to claim 5 including means mounting the extensible assemblies to the base for limited pivotal movement of said assemblies about a horizontal axis normal to the predetermined line.

7. Apparatus according to claim 6 wherein the chain drive sprockets are mounted for rotation about axes fixed relative to the base, each chain has opposite ends secured to the corresponding inner tube at locations spaced along the length of the inner tube, and the drive means for each extensible assembly includes a plurality of chain idler sprockets mounted for rotation about axes fixed relative to the corresponding outer tube, and means for maintaining the chain under constant tension irrespective of the position of the extensible assembly angularly of said horizontal axis.

8. Apparatus according to claim 7 wherein the constant tension means includes an additional chain idler sprocket disposed adjacent one of the idler sprockets mounted to the outer tube, and means mounting the additional sprocket to the base responsive to angular movement of the extensible assembly about said horizontal axis for moving the additional sprocket an amount sufficient to maintain constant the effective length of chain between the one and the additional sprockets.

9. Apparatus according to claim 8 wherein, in each extensible assembly drive means, the additional sprocket and the one sprocket are disposed next adjacent the drive sprocket along the chain on opposite sides of the drive sprocket.

10. Apparatus according to claim 8 including means for adjusting the distance of the additional sprocket from the one sprocket along the chain.

11. Apparatus according to claim 2 wherein the pipe driving and guiding head includes a rotatable hub assembly, a clamp assembly carried by the hub assembly for securing a length of drill pipe engaged with the hub assembly from rotation relative to the hub assembly, and a pair of frames disposed substantially parallel to said predetermined line and mounted one to each extensible assembly for rotatably mounting the hub assembly therebetween.

12. Apparatus according to claim 11 including means mounted to one of the frames for rotation of the hub assembly about a vertical axis disposed between the frames.

13. Apparatus according to claim 12 wherein the hub assembly is slotted radially from said axis along the entire extent of the hub assembly in a direction parallel to said axis of rotation to define a passage from a central portion of the hub assembly to the exterior thereof, the clamp assembly being arranged to hold a length of pipe essentially concentric to said axis of rotation.

14. Apparatus according to claim 13 wherein the hub assembly drive means includes a drive sprocket carried by the hub assembly and slotted radially from a central portion thereof to its outer diameter, a loop of chain, means mounting the chain to the one frame so that the chain engages a selected number of sprocket teeth on either side of the sprocket slot when the sprocket is positioned with the slot thereof extending normal to said predetermined line, and means mounted to the one frame for driving the chain in a selected direction to rotate the hub assembly any desired number of times in a corresponding direction.

15. Apparatus according to claim 11 including brace means engageable between the frames for maintaining a desired spacing between the frames, and means mounting the brace means to one of the frames for hinging movement into and out of engagement with the other frame.

16. Apparatus according to claim 15 including means biasing the brace means into engagement with the other frame.

17. Apparatus according to claim 2 including means mounting the extensible assemblies to the base for pivotal movement about a horizontal axis normal to said predetermined line.

18. Apparatus according to claim 17 including spring means supporting each extensible assembly in a predetermined position thereof angularly of said horizontal axis for a selected condition of extension of the extensible assembly.

19. In a drilling rig in which lengths of drill pipe are passed along a predetermined path into a derrick located above a rotary table mounted to a floor of the rig, apparatus for handling drill pipe and kelly joints including a pair of linearly extensible assemblies mounted to the rig to be parallel to each other and spaced on opposite sides of the path, a pipe handling head mounted between the extensible assemblies and supported thereby for movement along the path in response to operation of the extensible assemblies from over the rotary table to a location spaced laterally of the rotary table, the head including a generally circular hub mounted for rotation about a vertical axis intersecting the path, the hub being slotted from its axis of rotation to the periphery thereof, means for holding a length of drill pipe engaged in the slot essentially concentric to the hub axis and secure from rotation relative to the hub, and means for rotating the hub a plurality of times about its axis.

20. Apparatus for handling drill pipe and the like in a drill rig during drilling operations comprising:
(a) a base,
(b) a pipe handling head for receiving therein a length of drill pipe moved laterally thereinto, and
(c) selectively operable means mounting the head to the base and operable for reciprocating the head toward and away from the base along a substantially horizontal predetermined line,
(d) the pipe handling head being constructed to receive a length of drill pipe moved relative to the head in one direction substantially parallel to the predetermined line into engagement with the head and to discharge the length of drill pipe in the opposite direction relative to the head substantially parallel to the predetermined line.

21. Apparatus for handling drill pipe and the like in a drilling rig during operations upon the rig, comprising:
(a) a base,
(b) selectively operable means for mounting a pipe handling head to the base and operable for reciprocating such head toward and away from the base along a predetermined line, the selectively operable means including a pair of substantially identical extensible assemblies disposed parallel to each other on opposite sides of the predetermined line to define a passage therebetween along the line, and
(c) a pipe handling head supported by and disposed between the extensible assemblies and arranged to receive a pipe moved relative thereto in one direction along the line, to constrain the pipe relative thereto, and to discharge the pipe in the opposite direction relative to the head, thereby to effectively pass the pipe through the head along said line to and from said passage.

References Cited

UNITED STATES PATENTS

| | | | |
|---|---|---|---|
| 2,416,815 | 3/1947 | Calhoun | 214—2.5 |
| 2,450,934 | 10/1948 | Calhoun | 175—85 X |
| 2,615,681 | 10/1952 | True | 214—2.5 X |
| 3,083,842 | 4/1963 | Bauer et al. | 214—2.5 |
| 3,157,283 | 11/1964 | Maass et al. | |

CHARLES E. O'CONNELL, Primary Examiner

R. E. FAVREAU, Assistant Examiner

U.S. Cl. X.R.

175—5